L. JAENICHEN.
WEIGHT INDICATOR.
APPLICATION FILED SEPT. 19, 1921.
1,409,181.  Patented Mar. 14, 1922.
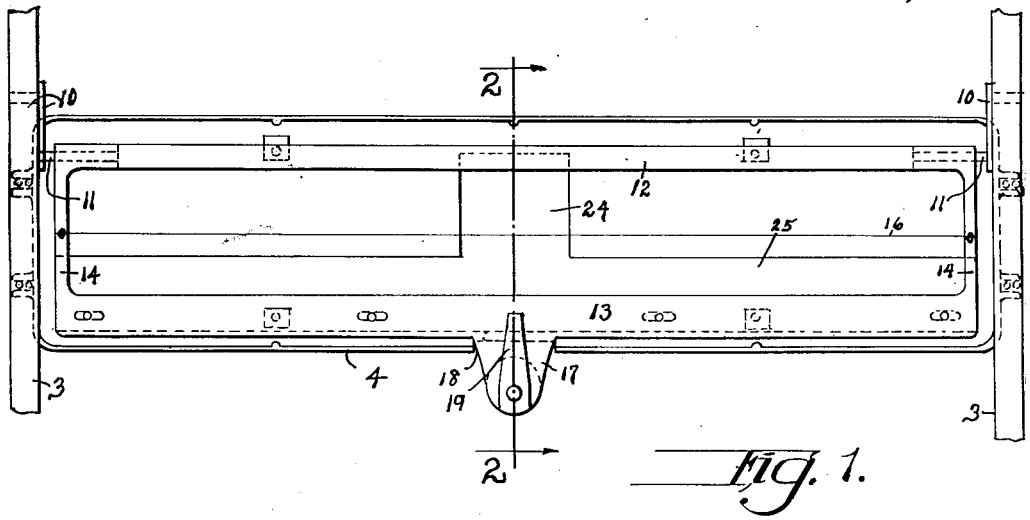
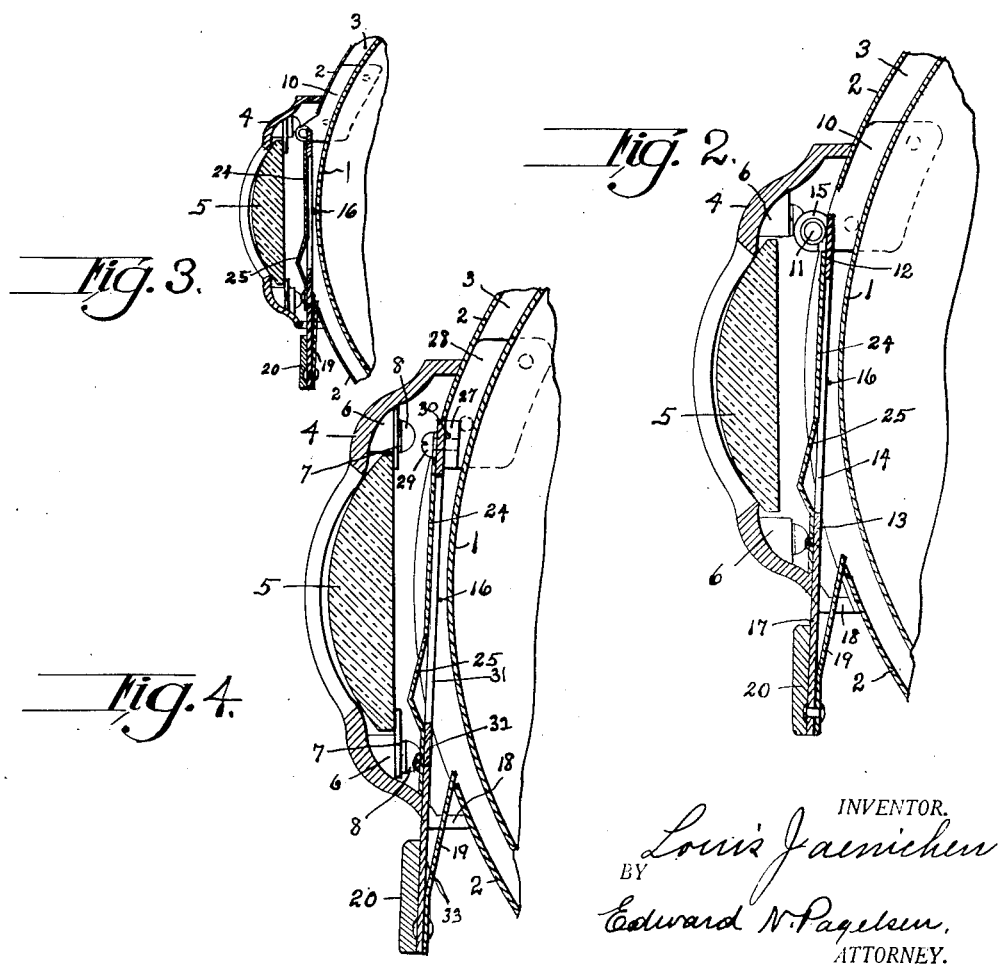
INVENTOR.
Louis Jaenichen
BY Edward N. Pagelsen,
ATTORNEY.

UNITED STATES PATENT OFFICE.

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

WEIGHT INDICATOR.

1,409,181.  Specification of Letters Patent.  Patented Mar. 14, 1922.

Application filed September 19, 1921. Serial No. 501,584.

*To all whom it may concern:*

Be it known that I, LOUIS JAENICHEN, a citizen of the United States, and residing at Detroit, in the county of Wayne and State of Michigan, have invented a new and Improved Weight Indicator, of which the following is a specification.

This invention consists of a wire mounted adjacent to the indicating drum of a weighing scale parallel to the axle of the drum and across the sight opening in the shell of the drum together with means for movably supporting the wire in the position indicated so that the wire may be moved into contact with the indicating drum so that accurate reading of the values on the drum may be insured. It further consists in the details of construction illustrated in the accompanying drawing and particularly pointed out in the claims.

In the drawing, Fig. 1 is an elevation taken from the right in Fig. 2 of this improved weight indicator. Fig. 2 is a section on the line 2—2 of Fig. 1. Fig. 3 is a similar section on a smaller scale showing the indicating wire moved up close to the indicating drum. Fig. 4 is a section similar to Fig. 2 of a modification of this invention.

Similar reference characters refer to like parts throughout the several views.

This present invention is especially designed to be used with that type of scales known as drum scales which are provided with a drum having circumferential rows of graduations and figures to indicate the weights and values at different prices of the articles on the scale platforms. These scales are in general use and are shown by the patents to Buckingham, No. 967,880, dated August 23, 1910, and to Jaenichen, No. 1,171,522 dated February 15, 1916.

The graduated drum 1 is usually mounted in a cylindrical shell 2 secured to circular heads 3, the shell having a gap at one side closed by a window frame 4 which carries the lens 5. Lugs 6 on this frame support the clips 7 which hold the lens in position. The screws 8 securing the clips.

Secured to each head 3 is a small bracket 10 carrying a pin 11 and on these pins an open rectangular frame consisting of a top bar 12, bottom bar 13 and end bars 14 is mounted, preferably by bending an ear into a cylindrical bearing 15 at each end of the top bar 12.

Stretching across and attached to the end bars 14, is a wire 16 which is positioned parallel to the axis of the graduated drum and preferably in the focal axial plane of the lens 5. A plate 17 extends down from the bottom bar 13 through a notch 18 in the bottom of the frame 4 and a spring 19 attached to this plate 17 contacts with the adjacent edge of the shell 2 to normally hold the wire away from the graduated drum. This plate 17 may be provided with a push button 20 if desired. These drums 1 are usually made of paper for the sake of lightness.

Where charts with unusually small spaces to show values are used they may be read incorrectly by persons of different heights. A tall man may read one value while a shorter man will read another value if the wire is not close to the chart. The necessity for bringing the wire closer to the chart in the manner described is very evident.

I have shown a plate 25 attached to the bottom bar 13, and a central extension 24 on this plate to cover the break in the drum which is usually in two parts, one on each side of the rack bar which turns the drum. The outer side of the horizontal portion of this plate is usually printed with the prices at which goods are to be sold to bring the values on the drum.

Instead of mounting the wire-supporting frame on pivots as shown in Figs. 1, 2 and 3, I may provide flat lugs 27 on the brackets 28 attached to the heads 3 and form the frame of resilient metal which may be attached at its upper corners to these lugs by means of screws 29. This frame again has a top bar 30, side bar 31 and bottom bar 32 from which the contact plate 33 extends down. The remainder of the construction and the reference characters are the same in this view as in Fig. 2. In each case, the wire 16 is preferably central of the reading opening of the window frame 5.

The details of construction and the proportions of the parts may all be changed by skilled scale makers without departing from the spirit of my invention as set forth in the following claims.

I claim:—

1. The combination with the frame of the reading opening of a drum scale, of an indicating wire, and means to support the wire parallel to the axis of the weight indicating drum, said means being freely movable to carry the wire toward and from the drum.

2. The combination with the window frame for the reading opening of a drum scale, of a second frame adapted to swing within said window frame toward and from the indicating drum of the scale, and an indicator wire mounted on said second frame to register with the graduations of said drum.

3. The combination with the indicating drum and the window frame for the reading opening of a weighing scale, of a wire extending longitudinally of the reading opening and parallel to the axis of the drum, movable means to support the wire so it may be moved into engagement with the drum, and resilient means to hold the wire away from the drum.

4. The combination with the indicating drum and the window frame for the reading opening of a weighing scale, of a wire extending longitudinally of the reading opening and parallel to the axis of the drum, means to support the wire so it may be moved into engagement with the drum, and means to hold the wire away from the drum.

5. The combination with the frame of a weighing scale having a reading opening, of an indicator, means to support the indicator, and a chart movable relative to the indicator, according to the load on the scale, said indicator support and said chart being relatively movable to vary the distance between the indicator and chart.

LOUIS JAENICHEN.